United States Patent
Dultz et al.

(10) Patent No.: US 6,900,874 B1
(45) Date of Patent: May 31, 2005

(54) DEVICE AND METHOD FOR THE TEMPERATURE-INDEPENDENT OPERATION OF ELECTRO-OPTICAL SWITCHES ON THE BASIS OF FERROELECTRIC LIQUID CRYSTALS HAVING A DEFORMED HELIX

(75) Inventors: Wolfgang Dultz, Frankfurt am Main (DE); Dirk Ganzke, Darmstadt (DE); Wolfgang Haase, Reinheim (DE); Eugene Pozhidaev, Moskau (RU)

(73) Assignee: Deutsche Telekom AG, Bonn (DE)

( * ) Notice: Subject to any disclaimer, the term of this patent is extended or adjusted under 35 U.S.C. 154(b) by 133 days.

(21) Appl. No.: 09/830,757

(22) PCT Filed: Aug. 24, 2000

(86) PCT No.: PCT/EP00/08261

§ 371 (c)(1),
(2), (4) Date: Sep. 25, 2001

(87) PCT Pub. No.: WO01/16647

PCT Pub. Date: Mar. 8, 2001

(30) Foreign Application Priority Data

Aug. 30, 1999  (DE) .......................................... 199 41 079

(51) Int. Cl.[7] .............................................. C09K 19/02
(52) U.S. Cl. ...................... 349/172; 349/100; 349/133; 349/181
(58) Field of Search ............................... 349/100, 133, 349/172, 181

(56) References Cited

U.S. PATENT DOCUMENTS

| 5,293,261 A | * | 3/1994 | Shashidhar et al. | ......... 349/183 |
| 5,627,666 A | * | 5/1997 | Sharp et al. | .................. 349/74 |
| 5,770,109 A | * | 6/1998 | Beresnev et al. | ...... 252/299.65 |
| 6,606,134 B1 | * | 8/2003 | Funfschilling et al. | ........ 349/74 |

FOREIGN PATENT DOCUMENTS

| DE | 43 03 335 | 8/1993 |
| EP | 0 356 730 | 3/1990 |
| EP | 0 813 096 | 12/1997 |
| EP | 0 907 089 | 4/1999 |
| JP | 10221718 A | * 8/1998 ........... G02F/1/141 |

OTHER PUBLICATIONS

*Fünfschilling, J. and Schadt, M., "Performance of Conventional and Novel Deformed Helix Ferroelectric Liquid Crystal Display Operating Modes", Japanese Journal of Applied Physics, Nov. 1, 1996, vol. 35, No. 11, part 01, pp. 5765–5774.
*Abdulhalim, I. and Moddel, G., "Electrically and Optically Controlled Light Modulation and Color Switching Using Helix Distortion of Ferroelectric Liquid Crystals", Molecular and Liquid Crystals, May 1, 1991, vol. 200, pp. 79–101.
*Pozhidaev, E. et al., "High Frequency and High Voltage Mode of Deformed Helix Ferroelectric Liquid Crystals in a Broad Temperature Range", Seventh International Conference on Ferroelectric Liquid Crystals, Darmstadt, Germany, Aug. 29–Sep. 3, 1999, vol. 246, No. 1–4, pp. 1141–1151.
**Walker, D.B. et al., "Ferroelectric liquid–crystal waveguide modulation based on a switchable uniaxial–uniaxial interface", Applied Optics, Jun. 1, 1996, vol. 35, No. 16, pp. 3016–3030.

* cited by examiner

*Primary Examiner*—George Eckert
*Assistant Examiner*—Matthew E. Warren
(74) *Attorney, Agent, or Firm*—Kenyon & Kenyon

(57) ABSTRACT

In order to substantially reduce temperature-dependent influences and attendant long switching times in the case of an optical liquid crystal modulator having at least one ferroelectric liquid crystal and in a method for operating an optical liquid crystal modulator, the ferroelectric liquid crystals are provided to have a DHF mode and to exhibit an operating range of an electric field of more than 20 V/μm at the location of the liquid crystal.

4 Claims, 2 Drawing Sheets

DEVICE AND METHOD FOR THE TEMPERATURE-INDEPENDENT OPERATION OF ELECTRO-OPTICAL SWITCHES ON THE BASIS OF FERROELECTRIC LIQUID CRYSTALS HAVING A DEFORMED HELIX

FIELD OF THE INVENTION

The present invention is directed to a device for the temperature-independent operation of electro-optical switches on the basis of ferroelectric liquid crystals having a deformed helix.

BACKGROUND INFORMATION

For some 20 years now, optical liquid crystals have fundamentally changed display technology. As economically priced light valves, they are also often used in the switching of the optical flow of information. The development of ferroelectric liquid crystals has moved switching times into the microsecond range. However, the fact that most of a liquid crystal's physical parameters are highly temperature dependent is still causing problems. Many technical instruments require that the components exhibit the same properties within a broad temperature range. In vehicle construction, in particular, temperature requirements are from −30° C. through +80° C. Optical overload-protection switches in open-air video-monitoring systems can also be exposed to such temperatures.

Examples of other applications are birefringent interference filters, which are spectrally tuned with the aid of liquid crystals (C. BARTA, et al., Crystal Optical Interference Filter, European Patent 0 907 089 A2).

So-called optically or electrically addressable, spatially resolving liquid crystal modulators (OASLM, EASLM), used to convert incoherent image information into coherent image information, were only able to be operated in conventional methods heretofore within narrow temperature ranges, since their switching times vary considerably in response to temperature.

SUMMARY OF THE INVENTION

The present invention provides device and a method which will substantially reduce temperature-dependent influences and attendant long switching times.

The present invention further provides a device and a method where ferroelectric liquid crystals exhibit temperature-independent and very short switching times, within a broad range, and, therefore, can be used for optical open-air switches and in vehicles.

The present invention further provides for an optical liquid crystal modulator to be used, where the ferroelectric liquid crystals have a DHF mode and are preferably operated within a range of the electric field of more than 20 V/$\mu$m. As a result, within a frequency range substantially above 50 kHZ, the modulator has a temperature-independent and extremely low response time.

DETAILED DESCRIPTION

The present invention employs ferroelectric liquid crystals for modulating light in liquid crystal modulators, whose design, in particular external electrodes made of transparent material. Ferroelectric liquid crystals are used, whose helix has a small pitch (<300 $\mu$m) and is able to be continuously deformed through application of a small electric field (so-called DHF mode). This DHF mode allows for continuous varying of the effective tilt angle $\theta_{eff}$ and the effective birefringence $\Delta\eta_{eff}$ at low voltages (<5V) and short switching times (<1 ms). The effective tilt angle can be equivalent in size to half of the angle of rotation of the indicatrix of the liquid crystal in the electric field; i.e., the greater the effective tilt angle is, the more intense the rotation of the indicatrix of the liquid crystal.

Since optical liquid crystal modulators are designed on the basis of the DHF mode as $\lambda/2$ magnification plates which rotate in the electric field, a single pass through the plate requires tilt angles of ±22.5 degrees in order to completely extinguish polarized light in the switching state "OFF" and obtain full transparency in the switching state "ON".

Figure 1:
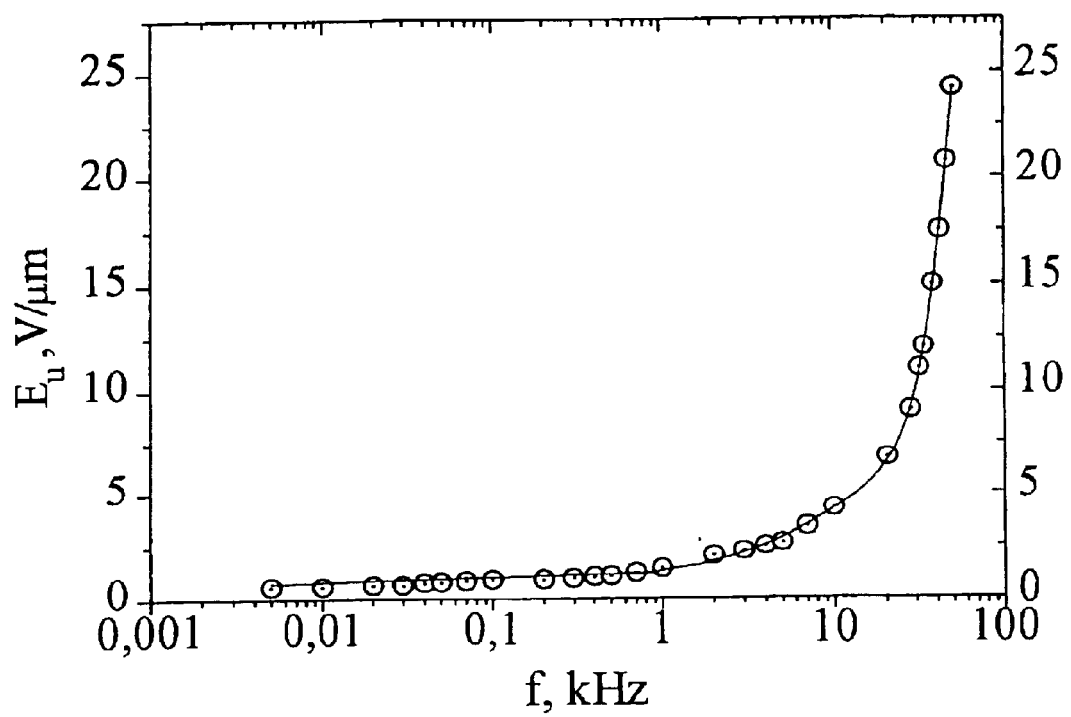
FIG. 1 shows the dependence of electric field $E_c$, necessary for complete winding of the helix, on the switching frequency f at T=20.0° C., the measurement being performed on a 2.0 $\mu$m thick cell in the liquid crystalline mixture FLC-388, and the helical pitch Po, at a temperature T=20.0° C., having the value of 0.22 $\mu$m, according to an embodiment of the present invention.

The electric field $E_U$, which is required for complete winding of the helix and which thereby induces the desired tilt angle, is relatively small at low frequencies (FIG. 1, $E_U$~0.5 through 1 V/$\mu$m at frequencies f smaller than 1 kHz). At higher frequencies, the field strength increases; in addition, the tilt angle also decreases. This may be seen in FIGS. 1 and 2.

At frequencies above 50 kHz, fields $E_U$>20 V/$\mu$m are necessary in order to completely unwind the helix. Thus, the region in which the DHF effect can be utilized is shifted toward higher fields.

Since higher fields lead to higher voltages on the liquid crystal and, moreover, lead to smaller tilt angles, till now, this region was not considered to be interesting from a technical standpoint.

In the exemplary embodiment according to the present invention, FIG. 1 depicts the dependency of electric field $E_c$, necessary for a complete winding of the helix, on switching frequency f at T=20.0° C. The measurement was performed on a 2.0 $\mu$m thick cell in a self-produced liquid crystalline mixture FLC-388. The helical pitch Po amounts to 0.22 $\mu$m at a temperature of T=20.0° C. In addition, at a temperature of approximately T=20.0° C., i.e., at about room temperature, the helical pitch Po lies within a range of 0.1 to 0.5.

With higher frequencies, however, the response time $\tau$ can be lowered by more than one order of magnitude, while tilt angle $\theta$ remains virtually constant up to very high frequencies. See FIG. 2. Thus, it may be that the contrast ratio and the birefringence also drop with the switching time, but acceptable values are still achieved for applications.

Figure 2:
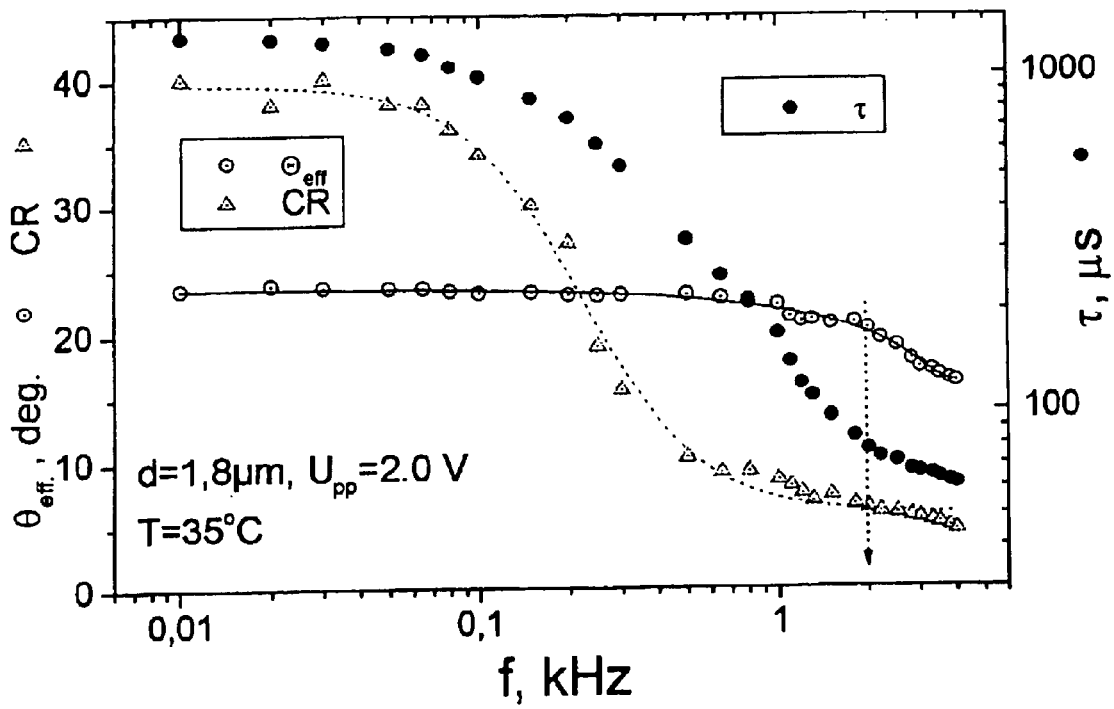
FIG. 2 shows the dependence of switching time $\tau$ of effective tilt angle $\theta_{eff}$ and of contrast ratio CR on the frequency of the electric field, having layer thickness d=1.8 $\mu$m, 20 $V_{pp}$, T=35° C., according to an embodiment of the present invention.

In the exemplary embodiment according to the present invention, FIG. 2 illustrates the dependency of switching time τ of the effective tilt angle $\theta_{eff}$ and of the contrast ratio CR on the frequency of the electric field at a layer thickness of d=1.8 μm and 20 $V_{pp}$, as well as at a temperature of T=35° C.

Figure 3:
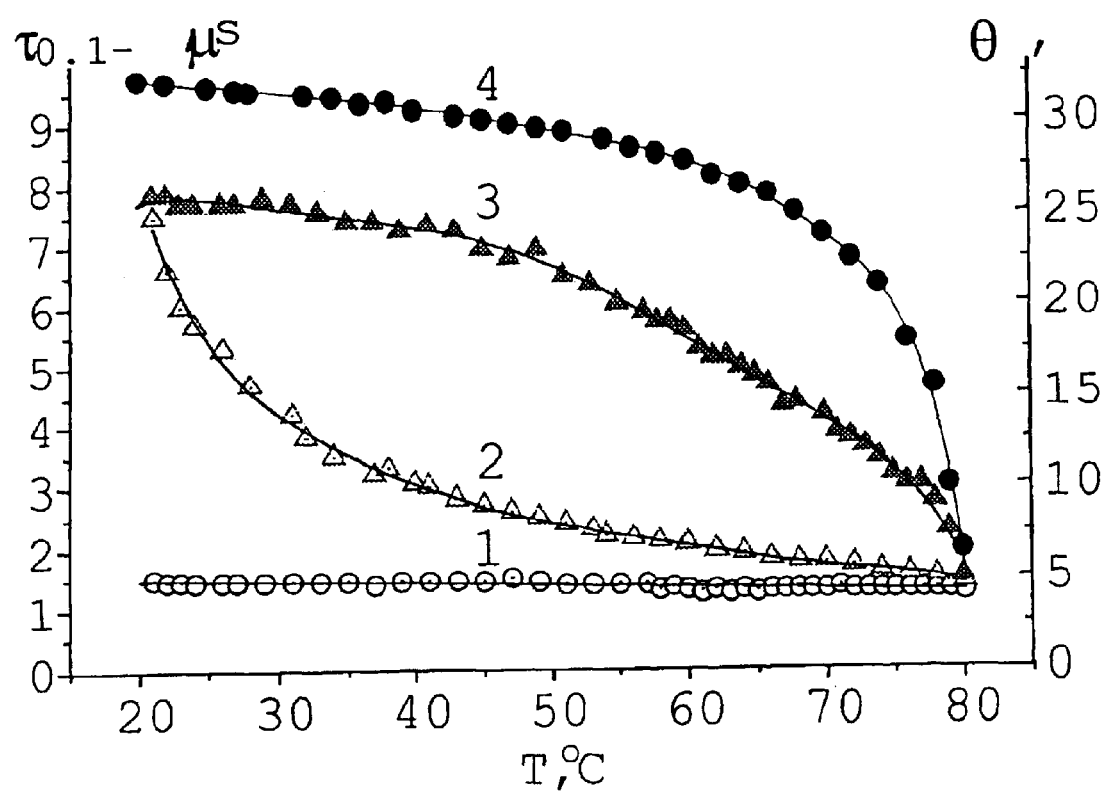
FIG. 3 shows the temperature dependence of switching time $\tau_{0.1-0.9}$ in the DHF mode at a frequency f=130 kHz and E=±15 V/$\mu$m (curve 1) and when switching the completely unwound state (E>$E_u$) at f=10 kHz and E=±15 V/$\mu$m (curve 2), the temperature dependence of tilt angle $\theta$ in the DHF mode at f=130 kHz and E=±15 V/$\mu$m (measuring curve 3) and in the unwound state at f=10 kHz and E=15 V/$\mu$m (curve 4).

In the exemplary embodiment according to the present invention, FIG. 3 depicts a measurement of response time τ as a function of the temperature for such a liquid crystal system. While at 10 kHz, response time τ is heavily temperature-dependent for an operation of the liquid crystal (curve 2), at an operating frequency of 130 kHz, it is not only very short, but also absolutely thermally stable (curve 1). In this context, the effective tilt angle changes only slightly, and the temperature dependency (curve 3+4) does not become significant until temperatures greater than 50° C.

By extensively optimizing the mixtures, as expected, a high-speed liquid crystal switch is able to be developed in accordance with the present invention for an application range of −20 through 80° C.

What is claimed is:

1. An optical liquid crystal modulator comprising:

at least one ferroelectric liquid crystal, wherein the at least one ferroelectric liquid crystal has a DHF mode and, at a location of the at least one ferroelectric liquid crystal, exhibits an operating range of an electric field of more than 20 V/μm, wherein at a temperature of about 20.0° C., a helical pitch Po is between about 0.1 to about 0.5 μm.

2. An optical liquid crystal modulator comprising:

at least one ferroelectric liquid crystal, wherein the at least one ferroelectric liquid crystal has a DHF mode and, at a location of the at least one ferroelectric liquid crystal, exhibits an operating range of an electric field of more than 20 V/μm, wherein at a temperature of about 20.0° C., a helical pitch Po is about 0.22 μm.

3. A method for operating an optical liquid crystal modulator having a ferroelectric liquid crystal, comprising:

operating the optical liquid crystal modulator at a location of the ferroelectric liquid crystal in an operating range of an electric field of greater than 20 V/μm, wherein the ferroelectric liquid crystal has a DHF mode and wherein the ferroelectric liquid crystal has a helical pitch Po of about 0.1 to 0.5 at a temperature of about 20.0° C.

4. A method for operating an optical liquid crystal modulator having a ferroelectric liquid crystal, comprising:

operating the optical liquid crystal modulator at a location of the ferroelectric liquid crystal in an operating range of an electric field of greater than 20 V/μm, wherein the ferroelectric liquid crystal has a DHF mode and wherein the ferroelectric liquid crystal has a helical pitch Po of about 0.22 μm at a temperature of about 20.0° C.

* * * * *